United States Patent [19]
Jolma

[11] Patent Number: 6,011,971
[45] Date of Patent: Jan. 4, 2000

[54] HANDOVER METHOD AND CELLULAR COMMUNICATIONS SYSTEM

[75] Inventor: Petri Jolma, Espoo, Finland

[73] Assignee: Nokia Telecommunications Oy, Espoo, Finland

[21] Appl. No.: 08/617,837

[22] PCT Filed: Jul. 5, 1995

[86] PCT No.: PCT/FI95/00389

§ 371 Date: May 16, 1996

§ 102(e) Date: May 16, 1996

[87] PCT Pub. No.: WO96/02117

PCT Pub. Date: Jan. 25, 1996

[30] Foreign Application Priority Data

Jul. 11, 1994 [FI] Finland ..................... 943303

[51] Int. Cl.[7] ........................................... H04Q 7/20
[52] U.S. Cl. .................... 455/438; 455/443; 455/440
[58] Field of Search .................... 455/436, 443, 455/437–439, 462, 440; 370/332

[56] References Cited

U.S. PATENT DOCUMENTS

| | | | |
|---|---|---|---|
| 4,737,978 | 4/1988 | Burke et al. | 455/438 |
| 4,779,253 | 10/1988 | Stern et al. | 455/453 |
| 4,893,327 | 1/1990 | Stern et al. | 455/453 |
| 5,161,249 | 11/1992 | Meche et al. | 455/436 |
| 5,208,847 | 5/1993 | Allen | 455/448 |
| 5,251,249 | 10/1993 | Allen et al. | 455/448 |
| 5,432,843 | 7/1995 | Bonta | 455/437 |
| 5,509,051 | 4/1996 | Barnett et al. | 455/443 |
| 5,561,845 | 10/1996 | Bendixen et al. | 455/443 |
| 5,594,718 | 1/1997 | Weaver | 455/437 |
| 5,613,213 | 3/1997 | Naddell et al. | 455/414 |
| 5,682,416 | 10/1997 | Schmidt et al. | 455/63 |
| 5,697,055 | 12/1997 | Gilhousen et al. | 370/332 |

FOREIGN PATENT DOCUMENTS

| | | | |
|---|---|---|---|
| WO 93/06683 | 4/1993 | WIPO | H04M 11/00 |

OTHER PUBLICATIONS

"EIA/TIA Interim Standard: Mobile Station–Base Station Compatibility Standard for Dual–Mode Wideband Spread Spectrum Cellular System", TAI/EIA/IS–95, Jul. 1993, p. 7–71.

*Primary Examiner*—Dwayne D. Bost
*Assistant Examiner*—Tracy M. Legree
*Attorney, Agent, or Firm*—Pillsbury Madison & Sutro LLP

[57] ABSTRACT

For accomplishing an interference-free handover in a cellular communication system which has at least one base station per cell, which base station is controlled by a base station controller which controls one or more base stations, and which base station controller, with the base station or stations under its control, forms a base station system, the respective service areas of respective base stations under different base station controllers at the border or borders of two or more base station systems are caused to at least partly overlap. As a terminal equipment moves from one base station system to another, handover of the terminal equipment from one base station to another is carried out so that as the terminal equipment moves into a cell served by all of two or more base stations which belong to areas of different base station controllers, the terminal equipment carries out a soft handover from an existing base station to a new base station, and, as it further moves towards a respective cell border, it carries out a hard handover from the previously serving base station the previously serving base station system to a respective base station of the newly serving base station system, the service area of which at least partly overlaps with that of the previously serving base station.

4 Claims, 3 Drawing Sheets

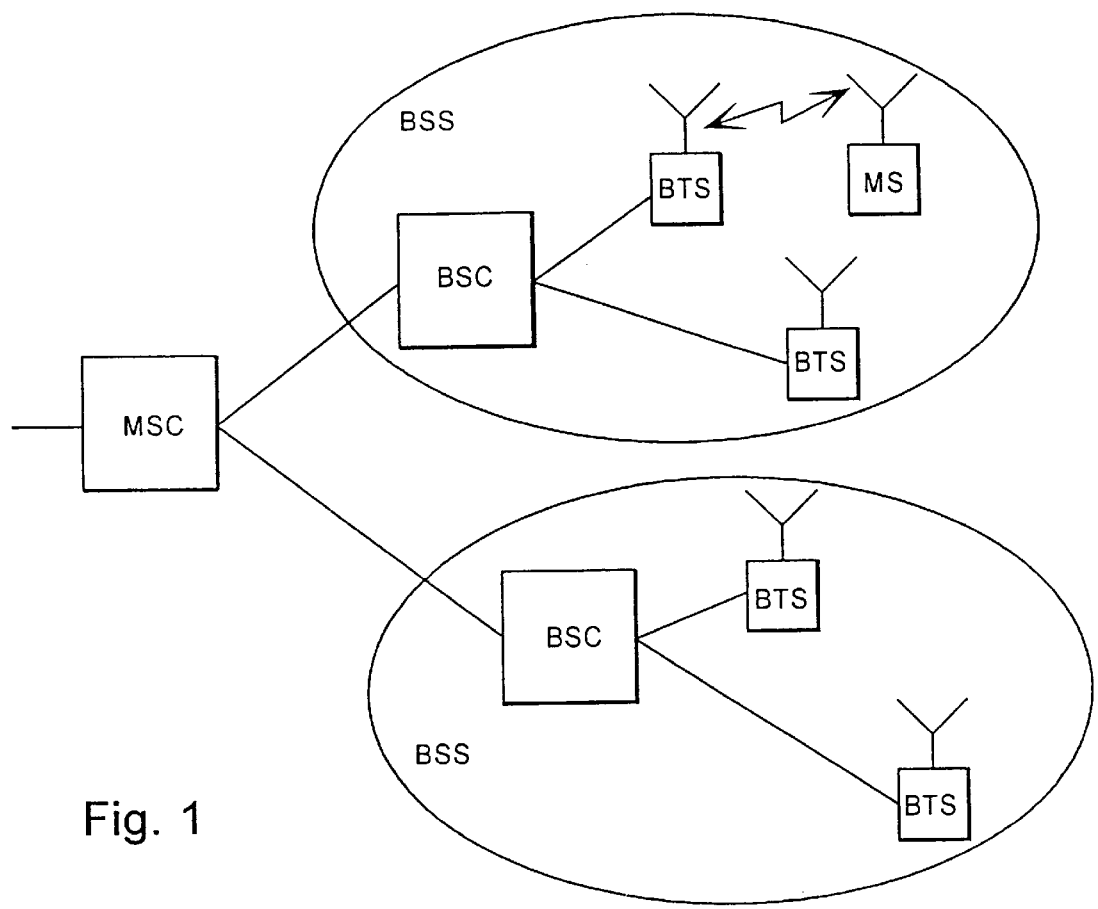
Fig. 1
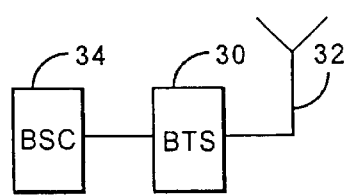
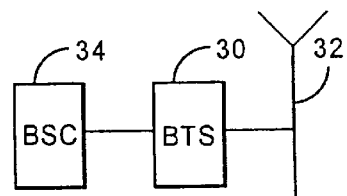
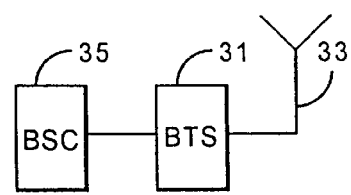
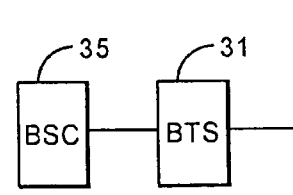
Fig. 3a  Fig. 3b

HANDOVER METHOD AND CELLULAR COMMUNICATIONS SYSTEM

This application claims benefit of international application PCT/FI95/00389 filed Jul. 5, 1995.

BACKGROUND OF THE INVENTION

The present invention relates to a method for accomplishing a handover in a cellular communication system which comprises at least one base station per each cell, which base station is controlled by a base station controller which controls one or more base stations, and which base station controller with the base stations under its control forms a base station system.

The present invention is particularly applicable to CDMA cellular communication systems. A CDMA (Code Division Multiple Access) system is a multiple access method which is based on spread spectrum technology and whose application in cellular communication systems has lately been initiated along with the earlier initiated FDMA (Frequency Division Multiple Access) and TDMA (Time Division Multiple Access) technologies. The CDMA technology has several advantages over the earlier initiated methods, such as spectral efficiency, simple frequency planning and improved traffic capacity.

In a CDMA method, the narrow-band data signal of the user is multiplied by a spreading code of much wider bandwidth, to a relatively wide traffic channel band. In the known experimental cellular network systems, the bandwidths used on traffic channels include, for example, 1.25 MHz, 10 MHz and 25 MHz. In the multiplying process, the data signal spreads to the whole band used. All users transmit simultaneously by using the same frequency band, i.e. traffic channel. A separate spreading code is employed for each connection between a base station and a subscriber terminal equipment, and the signals from the users can be identified from each other in the receivers on the basis of the spreading code of each connection.

In a CDMA system, then, all users transmit on the same, relatively wide frequency band. The traffic channel of the user is formed by a spreading code which is characteristic to the connection and on the basis of which the transmission of the user is identified from the transmissions of other connections, as described earlier. As a considerable number of spreading codes are usually in use, the CDMA system does not have a definite capacity limit like the FDMA and the TDMA systems. The CDMA system is a so-called interference restricted system, in which the number of users is restricted by the level of interference allowed for one user to cause to another. As the spreading codes of the users in a given cell in the systems in use are not fully uncorrelated with regard to spreading codes employed by users in neighbouring cells, especially, simultaneous users cause interference to each other to some extent. This kind of interference caused by one user to another is referred to as multiuser interference. As the number of users increases, the level of interference they cause to each other consequently increases, and, as the number of users reaches a certain level, the interference increases so as to damage the quality of the connections. In a CDMA system, it is possible to determine an interference level not to be exceeded, and so to set a limit to the number of simultaneous users, i.e. limit to the capacity of the system. A temporary exceeding of this number can, however, be allowed, which means that some of the connection quality is sacrificed at the expense of capacity.

In a typical mobile station environment, signals between a base station and a mobile station travel by several different paths between the transmitter and the receiver. This multipath propagation is mainly caused by signals reflecting from surrounding surfaces. Signals that have travelled from a transmitting user via different paths arrive at a receiver at different times due to different delays in the propagation time. The CDMA method differs from the conventional FDMA and TDMA methods in that in the CDMA method, the multipath propagation can be utilized in the reception of signals. As a CDMA receiver, a so-called RAKE receiver consisting of one or more RAKE branches is commonly employed. Each branch is an independent receiving unit whose function is to compose and demodulate one received signal component. Each RAKE branch can be controlled to synchronize into a signal component that has travelled along a path of its own, and, in a conventional CDMA receiver, the signals of the receiving branches are advantageously combined, and thus, a good-quality signal is obtained.

It is possible that the signal components received by the branches of a CDMA mobile station receiver have been transmitted by one or more base stations. In the latter case, a so-called macro-diversity is involved, i.e. a diversity mode by which the quality of a connection between a mobile station and a base station can be improved. In CDMA cellular communication networks, macro-diversity, also referred to by the term soft handover, is employed for ensuring the operation of power control at the base station border areas, and for enabling a seamless handover. Thus, a mobile station employing macro-diversity simultaneously communicates with two or more base stations. All connections transmit the same information. As an example of a cellular communication system employing macro-diversity, the publication EIA/TIA Interim Standard: Mobile Station-Base Station Compatibility Standard for Dual-Mode Wideband Spread Spectrum Cellular System, TAI/EIA/IS-95, July 1993 is referred to.

Thus, in a macro-diversity situation, the terminal equipment can combine signals transmitted by different base stations. At the base station end, signals received by two separate base stations from the terminal equipment are combined at the first possible point, which in most cases is the base station controller in whose area the base stations are located. If the base stations to which the terminal equipment is coupled are under control of different base station controllers, the practical implementation of a soft handover will be considerably complicated, because in such a case, the connecting has to be carried out in a mobile services switching center.

Older cellular communication systems, such as GSM, NMT and AMPS, employ a so-called hard handover, in which the base station change is carried out by first breaking the connection to the old base station and then establishing connection to a new base station. In such a case, then, the terminal equipment is coupled to only one base station at a time. Hard handover technology is simpler to implement than is soft handover technology. So far, hard handover has not been applied to CDMA systems, because it causes instability in power control. Because the system is interference restricted, accurate power control is a prerequisite for the operation of a CDMA system.

SUMMARY OF THE INVENTION

It is an object of the present invention to make it possible to use both soft and hard handover, especially in a CDMA cellular communication system, so that the advantages of both methods are obtained.

This is achieved by a method of the type set forth in the foregoing BACKGROUND section, characterized in that at the border, or borders, of two or more base station systems, the service areas of those of the respective base stations which are under control of different base station controllers, relative to one another, are caused to at least partly overlap, and that as a terminal equipment moves from one base station system to another, the handover is carried out so that as the terminal equipment moves into a cell served by two or more base stations which belong to areas of different base station controllers, the terminal equipment carries out a soft handover from the old cell to the new cell, and as it further moves towards the cell border, it carries out a hard handover from the base station of the old base station system to the base station of the new base station system the service area of which base station at least partly overlaps with the previous base station.

The invention further relates to a cellular communication system which comprises in each cell at least one base station controlled by a base station controller which has one or more base stations under its control, and which base station controller with said base stations under its control form a base station system. It is characteristic of a cellular communication system of the invention that at the border area of two or more base station systems, the service areas of base stations under control of different base station controllers at least partly overlap.

By the method of the invention, the power control of the network remains stable even when hard handover is employed, and the complexity of a soft handover at the border between two base station controllers can be avoided.

By the invention, the use of soft handover and hard handover technology can be combined, so that if a subscriber terminal equipment is within a base station system, it is handed over from a base station to another by a soft handover, and the base station change to the area of the new base station controller is carried out by a hard handover. In an implementation in accordance with the invention in which service areas of base stations which are at the border of base station controllers overlap, the problems the hard handover earlier caused to the power control of the system are avoided.

BRIEF DESCRIPTION OF THE DRAWINGS

In the following, the invention will be described in closer detail with reference to the accompanying drawings, in which:

FIG. 1 is a block diagram exemplary illustration of the structure of a cellular communication system, FIGS. 3a–3c are exemplary illustrations of a base station configuration.

DETAILED DESCRIPTION

FIG. 1 illustrates a typical structure of a cellular communication system. The area covered by the system is typically divided into base station systems BSS, each of which consists of a base station controller BSC and base stations BTS coupled to the respective BSC, which base stations serve the subscriber terminal equipments MS in the respective service areas of the respective base stations. The base station controllers, in turn, are typically coupled to mobile services switching centers MSC, from which calls are routed to the fixed network and to other mobile services switching centers.

In a typical system employing a soft handover, the control functions of each base station system BSS are concentrated in a respective base station controller BSC. A base station BTS handles the operations of the physical layer, such as transmitting and receiving of the signal over the radio path, and is to a great extent a transparent component from the point of view of signalling between the terminal equipment and the higher levels of the system. Typical functions of a base station controller include, for example, controlling of radio resources within the respective base station system BSS, connecting signals between the respective base stations BTS and the rest of the network, controlling macro-diversity, and balancing power control in the whole BSS area.

Figure 2:
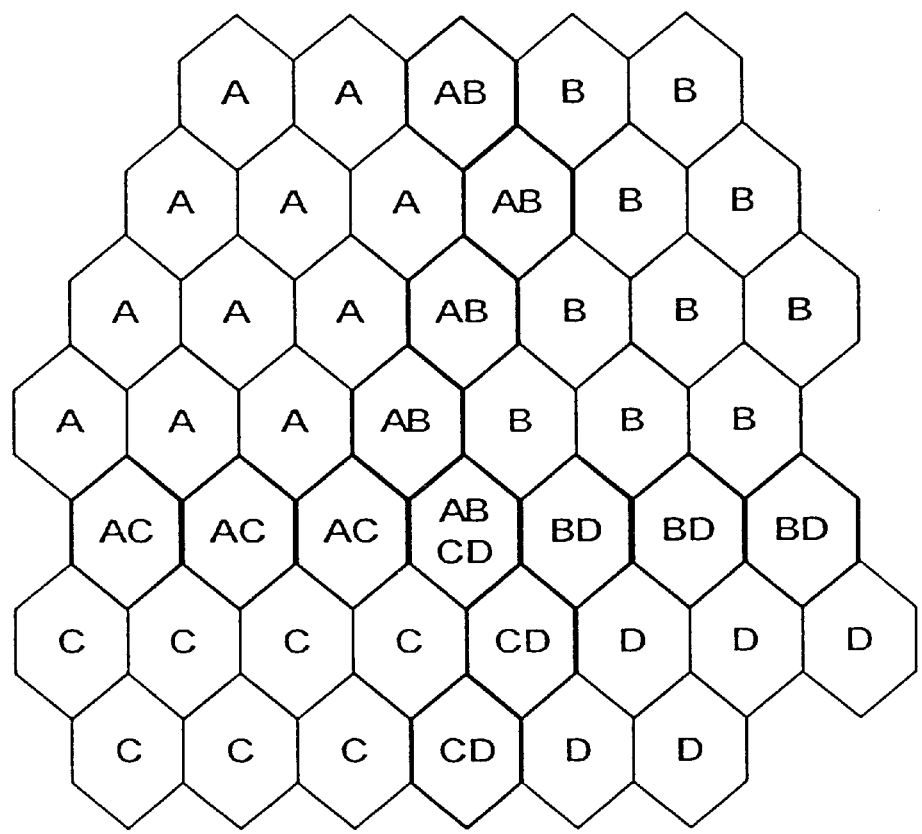
FIG. 2 is an exemplary illustration of a cellular communication system in accordance with the invention.

The structure of a cellular communication system is illustrated in FIG. 2. The figure shows a number of cells within the system, each cell being served by a base station. The area of the system in the figure is divided into four base station systems A, B, C, and D, which are so marked in the figure. In a cellular communication system of the invention, the cells located at each border area between two base station systems are served by two base stations that belong to the areas of responsibility of a respective two different base station controllers. In the figure, these cells are marked by two letters, for example, AB, which cell is thus served by base stations under the control of base station systems A and B.

The operations of the two base stations are independent of each other, but because their coverage areas and propagation conditions are identical, their operations do not interfere with each other. Both of the base stations independently control the transmitting power levels of those terminal equipments to which they are coupled. Both base stations, in addition, operate in the same frequency range, but they employ different spreading codes. Because of the identical coverage area, the interference level to both base stations is identical, and so, the power control functions are balanced, as in a situation in which a cell is served by one base station. It should be noted, however, that the combined capacity of the base stations is the same as in a case of a cell served by only one base station, because the cell total interference, which limits the capacity of the cell, is equal in both cases.

Overlapping cells usually comprise two base stations, but at the corners of base station systems it may be necessary to use a combination of, for example, three or even more base stations. In the example of FIG. 2, the center cell, located at the node (i.e. the region of overlap) of four base station systems, comprises four base stations respectively under control of four base station controllers A, B, C and D.

In the example of FIG. 2, there are cells at a depth of one cell, but at the border of BSS areas, it is also possible to use overlapping cells at a depth of two cells. The network planning must be so carried out that a situation does not emerge in which a terminal equipment would have to be in a soft handover situation to base stations of different base station systems. A situation such as this can always be blocked, if there is enough depth in the overlapping of cells.

Figure 3C:
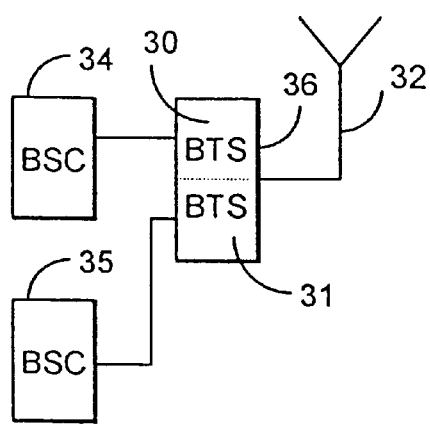

Base stations serving the same geographical area can be implemented in several different ways, some of which are illustrated in FIGS. 3a–3c. FIG. 3a illustrates an example in which base stations have been implemented as units 30, 31 which are totally independent of each other, and both have separate antennas 32, 33. The antennas should be placed close to one another in order that the radio paths of both cells have equal propagation conditions. Each base station is connected to a respective base station controller 34, 35.

FIG. 3b shows a preferred embodiment of the invention, in which embodiment the base station equipments proper 30, 31 are separate, but employ the same antenna 32. In such a case, the cost of a base station is lower than in the embodiment mentioned earlier, because the antenna and mast costs are lower.

FIG. 3c illustrates a second preferred embodiment of a cellular communication system in accordance with the invention, in which embodiment overlapping base station equipments are implemented by dividing a physical base station equipment 36 into two logical sections 30, 31 which are respectively under control of different base station controllers 34, 35 and employ the same antenna 32. Thus, base stations 30, 31 employ the same physical resources, except that the equipment must have separate connections for two base station controllers.

Figure 4:
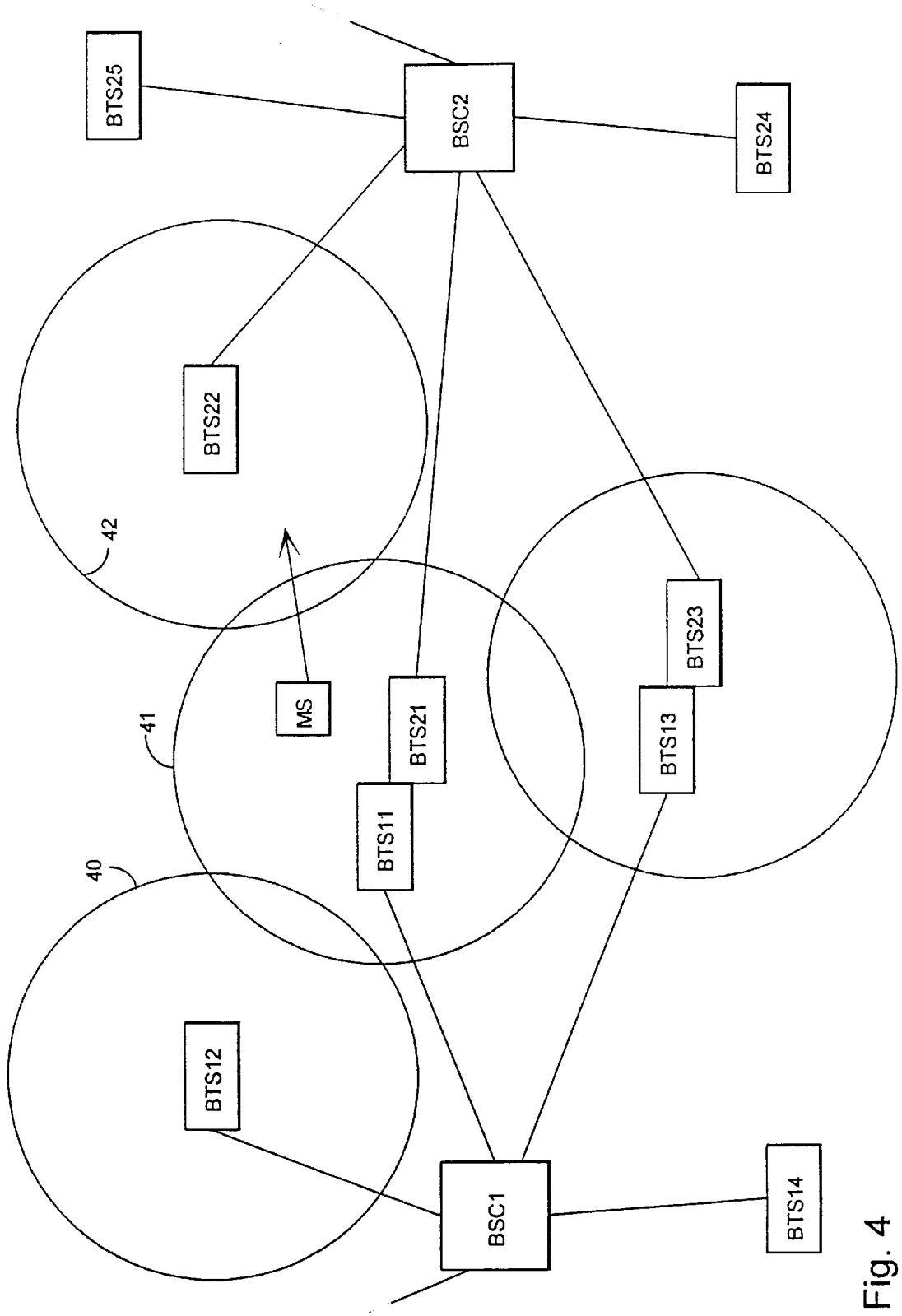
FIG. 4 illustrates the operation of the method of the invention.

In the following, the method of the invention will be described in closer detail with reference to FIG. 4. The figure shows two base station controllers BSC1 and BSC2. of the several base stations which are under the control of the first base station controller BSC1, base stations BTS11–BTS14 are shown in the figure. Of the several base stations which are under the control of the second base station controller BSC2, base stations BTS21–BTS25 are shown in the figure.

In the example depicted, a subscriber terminal equipment MS moves in the BSC1 area towards the BSC2 area. As the terminal equipment moves from one cell to another, the base station controller BSC1 attends to the handovers and the stability of power control. The handovers are carried out as soft handovers so that a connection to the new base station is established before the old connection breaks.

Let us assume that a terminal equipment MS moves from the cell 40 served by the base station BTS12 to the cell 41 which is at the border between two base station systems. The cell 41 is served by two overlapping base stations, BTS11 and BTS21. BTS11 is coupled to base station controller BSC1, and BTS21 is coupled to base station controller BSC2. As the terminal equipment moves from cell 40 into cell 41, it carries out, controlled by BSC1, a soft handover to a traffic channel of base station BTS11.

Let us further assume that the terminal equipment moves towards the cell 42 and finally into the area of cell 42. The base station BTS22 serving the cell 42 is under control of base station controller BSC2. Before it is possible to activate the base station BTS22 for a handover, control of an ongoing call in which the terminal equipment is participating must first be switched to base station controller BSC2 from the present controller BSC1. This is done by a hard handover. The terminal equipment carries out a hard handover from the base station BTS11 to the base station BTS21, and consequently, the base station controller change from BSC1 to BSC2 takes place. In a hard handover, the spreading code employed by the terminal equipment changes. As the handover, from the point of view of the terminal equipment, is carried out in a same cell, no sudden changes in the power used by the terminal equipment take place.

If the terminal equipment is, at the moment the handover is carried out, simultaneously coupled to several base stations which serve overlapping cells, the hard handover is also carried out at these base stations simultaneously. A situation such as this is possible especially in cases there are overlapping base stations at a depth of several plural cells at the border areas between base station systems.

Thus, the terminal equipment is now under control of base station controller BSC2, and, as it moves deeper into the cell 42, it can carry out a soft handover to a base station BTS22 channel in the normal manner.

Although the invention is described above with reference to the examples depicted in the accompanying drawings, it is obvious that the invention is not restricted to them, but it can be varied in many ways within the scope of the invention claimed in the attached claims.

I claim:

1. A method for accomplishing a handover in a cellular communication system which has at least one base station per cell for a plurality of cells, each base station having a respective area and being controlled by a respective base station controller having a respective area and which controls one or more of the base stations such that there are at least two of said base station controllers each said base station controller, together with the respective base station or base stations under its control form a respective base station system, such that there are at least two base station systems which adjoin one another at a respective border or at respective boarders, comprising the steps of:

causing the respective service areas of respective ones of said base stations which are under control of different base station controllers at each said at least partly overlap carrying out a handover as a terminal equipment moves from one said base station system to another said base station system, such that as said terminal equipment moves into a respective said cell which is served by a respective two or more said base stations which belong to the areas of respective different ones of said base station controllers, said terminal equipment first carries out a soft handover from a first respective said base station to a second respective said base station, and as said terminal equipment further moves towards a respective said cell border where respective said service areas at least partly overlap due to said causing, said terminal equipment carries out a hard handover from said first base station to said second base station.

2. The method as claimed in claim 1, wherein:

if said terminal equipment, at the moment said hard handover is being carried out, is simultaneously coupled to a plurality of said base stations, which are located in cells in which service areas of base stations that belong to areas of different base station controllers at least partly overlap, said method further comprises:

carrying out said hard handover simultaneously in regard to all base stations of said plurality of base stations.

3. The method as claimed in claim 1, further comprising:

activating said hard handover when connection quality between said terminal equipment and said first base station deteriorates below a predetermined threshold of connection quality.

4. A cellular communication system, comprising:

in each cell of a plurality of cells at least one base station having a respective area and being controlled by a respective base station controller having a respective area and having one or more of said base stations under its control, such that there are at least two of said base station controllers;

each said base station controller, together with the respective said base station or base stations under its control forming a respective base station system such that there are at least two base station systems which adjoin one another at a respective border or at respective borders;

at each border where a respective two or more of said base station systems adjoin, the respective service areas of the respective ones of said base stations which are under control of different ones of said base station controllers at least partly overlapping; said respective ones of said base stations at at least one said border all being implemented by logically dividing one base station equipment into respective sections controlled by a respective at least two of said base station controllers.

* * * * *